(12) United States Patent
Sonderegger

(10) Patent No.: US 6,301,544 B1
(45) Date of Patent: Oct. 9, 2001

(54) TRAFFIC MONITORING SYSTEM

(75) Inventor: Hans Conrad Sonderegger, Neftenbach (CH)

(73) Assignee: K.K. Holding AG, Winterthur (CH)

( * ) Notice: Subject to any disclaimer, the term of this patent is extended or adjusted under 35 U.S.C. 154(b) by 0 days.

(21) Appl. No.: 09/385,355

(22) Filed: Aug. 30, 1999

(30) Foreign Application Priority Data

Oct. 29, 1998 (EP) .................................................. 98811083

(51) Int. Cl.$^7$ ........................................................ G06F 19/00
(52) U.S. Cl. ...................... 701/117; 701/118; 340/933; 340/938; 340/940; 73/146.2; 348/149
(58) Field of Search .................................. 701/117, 118, 701/119; 340/938, 905, 940, 933, 934, 935; 73/146.2; 348/149

(56) References Cited

U.S. PATENT DOCUMENTS

| | | | |
|---|---|---|---|
| 4,630,470 | 12/1986 | Brooke et al. | 73/146.2 |
| 4,799,381 | 1/1989 | Tromp | 73/146 |
| 5,002,141 | 3/1991 | Loshbough et al. | 177/210 FP |
| 5,445,020 | 8/1995 | Rosensweig | 73/146.2 |
| 5,461,924 | 10/1995 | Calderara et al. | 73/786 |
| 5,753,810 | 5/1998 | Bass | 73/146.3 |
| 5,942,681 | 8/1999 | Vollenweider et al. | 73/146.2 |
| 5,962,779 | 10/1999 | Bass | 73/146.5 |
| 5,979,230 | 11/1999 | Balsarotti | 73/121 |

FOREIGN PATENT DOCUMENTS 2 567 550   1/1986   (FR) .

OTHER PUBLICATIONS

Surveillance des pressions des pneumatiques du métro de Paris, Roland Groliere and Jean Chesse, Revue Générale Des Chemins De Fer, May 1991, Nos. 5, Paris France.

*Primary Examiner*—Tan Nguyen
*Assistant Examiner*—Gertrude Arthur
(74) *Attorney, Agent, or Firm*—Barnes & Thornburg

(57) ABSTRACT

A traffic management systems, combining different monitoring capabilities, beginning with standard WIM (Weigh in Motion) systems for axle weight measurements, combined with tire pressure monitoring in motion and suspension monitoring in motion, whereby for all three specialties, novel road embedded force measuring sensors are used, partly for force measurement and partly for switching operation upon touching the edge of the sensors by the onrolling tire, whereby all possible combinations of the three specialties are within the scope of the invention.

10 Claims, 2 Drawing Sheets

TRAFFIC MONITORING SYSTEM

BACKGROUND AND SUMMARY OF THE INVENTION

The present invention relating generally to traffic monitoring systems and more specifically, to weight in motion sensors in the monitoring system.

WIM sensors (Weigh in Motion) built into road surfaces were introduced about 10 years ago and have been in use ever since, especially in the USA. For pre-selection of overweight axles, considerable success has been reached in the last few years. A most promising strip-type sensor was the introduction of the quartz piezo WIM sensor as explained in U.S. Pat. No. 5,461,924. The measuring accuracies are not yet satisfactory, mainly due to dynamic induced vibrations by vehicles. Therefore, it is the object of the invention to additionally monitor tire pressures and/or "road knockers", which are defects due to faults in suspension.

The solid state design of the WIM sensors has not only excellent force measuring properties, but may also be used as a high precision switching design, as explained further on. This new sensor will, therefore, allow new and unique combinations of weigh measuring as well as of monitoring tire pressure and "road knockers". A future standard WIM station thus could also be used for measuring tire pressure as well as for a "road knockers" monitoring station.

The invention has the further advantage that existing WIM stations could be supplemented with additional equipment and software, with the feature of tire pressure monitoring as an important addition to an already existing WIM station.

A further supplement of additional sensors and computer capacity would result in a third capability that would allow to detect "road knockers". The possibility to grade up existing WIM stations in one or two steps toward higher monitoring capability is an economic feature of the invention. Since WIM stations belong to the state of the art, the invention concentrates now on
- tire pressure monitoring
- "road knockers" monitoring
- combinations with well known "Weigh in Motion" monitoring, bringing thus the state of traffic monitoring onto a considerable higher level. These additional steps are possible with the same quartz piezo sensors as will be explained later.

1. Some explanations on Tire Pressure Monitoring

It is a well known fact that busses, trucks and other heavy road vehicles can be safely driven at highway speed only when all tires operate under normal tire pressure. Statistics in Great Britain revealed that ≈16% of heavy accidents were due to improper tire pressure.

There are many reasons for under or over pressure in tires. Once the vehicle is on the move, additional reasons may contribute to changes in the tire pressure. Therefore, without a built in tire pressure control system, the driver has no information available to him for adequate detection of this facet and, consequently, in this regard the safety of his vehicle is not within his complete control.

It is another well known fact that tires with overpressure reduce rolling resistance and thus reduce fuel consumption. There are also special high pressure tires on the market, however, in many States these "railroaders" are allowed only in the cold season, as they may cause heavy damage to the road during the summer season, with possible grooving of the softened asphalt.

The art of tire pressure measurement in motion, TPM, is still in the research state and nothing has been published by experimental stations. The reason for this is to be found in the complexity of the problems involved. No useful sensors have yet emerged, and visual methods cannot be considered. A main and simple parameter of the amount of air pressure in a loaded tire is its print length L, the length of the tire contact area. The measurement of this parameter, the presentation and evaluation of its results will be a part of this invention.

In order to simplify the problems, consideration will be given only to heavy-load vehicles, like busses and trucks, driving at highway speed. These vehicles must have similar wheel diameters and tires and thus will be the No 1 category. A further category, for instance with smaller wheels, would be category No. 2 and would need one, two or more additional sensors mounted in correspondingly different distances.

With this simplification of the No 1 category, approx. 70 to 80% of heavy-load vehicles can be monitored within the limits:

| | |
|---|---|
| A | too low air pressure |
| B | normal air pressure |
| C | too high air pressure |

The axle load, of course, will have to be considered:
- full load
- half load

This will have a correctional influence.

Under these limitations, a collection of print lengths has to be set up, consisting of information given by the tire manufacturers as well as resulting from practical measurements. Statistical evaluations will reveal the important selection, Distances $D_2$ and $D_3$ of the sensors as will be explained further on.

The proposed monitoring system will consist of a pre-selection group of sensors and a selection group of sensors. The pre-selection group determines vehicle speed and axle weight in order to establish the load factor. The selection group of sensors separates the

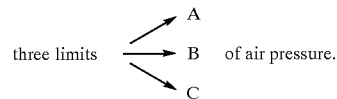

three limits → A, B, C of air pressure.

The load factor will influence the tolerance limits by proper software compensation factors. The computer can distinguish the three basic forms of the evaluated curves immediately and can give the danger signal if only one of the up to 20 wheels of a vehicle, travelling at 80 miles/hour, has triggered the sensors signals.

The invention thus will detect in up to 90 to 95% of all cases the faulty vehicles and will direct them to a bypass station. Consequently, this will bring a considerable improvement in traffic safety and a reduction of road degradation.

2. Some Explanations to "Road Knocker" Monitoring

Another matter of concern and especially worrisome for operators of highways are the "road knockers", vehicles with defect suspension systems. Often such faults are not detected in normal service operations and occur mainly in certain speed ranges, in frequencies well above the basic vehicle vibrations. The knocking amplitudes of such random vibrations can reach up to +20% and more of the average static wheel load. This, therefore, is presenting a danger for blow-outs of tires and may destroy the road surfaces as well.

For traffic safety and road degradation reasons, it is thus most important to detect vehicles with defect suspension systems. No reliable detection system for such faults has so far been presented. This, however, will form the second part of this invention where methods are proposed on how to detect between 30 to 60% of "road knockers". With enlargement of the sensor base and with corresponding computer capacity, this percentage might be considerably improved.

The invention presents solutions for an optimal traffic monitoring system, consisting of means to monitor wheel axle and total weight too low or too high tire air pressure defect suspension systems.

All three monitored parameters are measured with the very same quartz piezo WIM sensors, arranged in different configurations. The invention will also cover parts of the ideal combination, like tire air pressure faults road knocking faults and will, of course, also cover one or the other. Electronics and computer software will have to be separately adjusted to each solution and will not be treated here.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
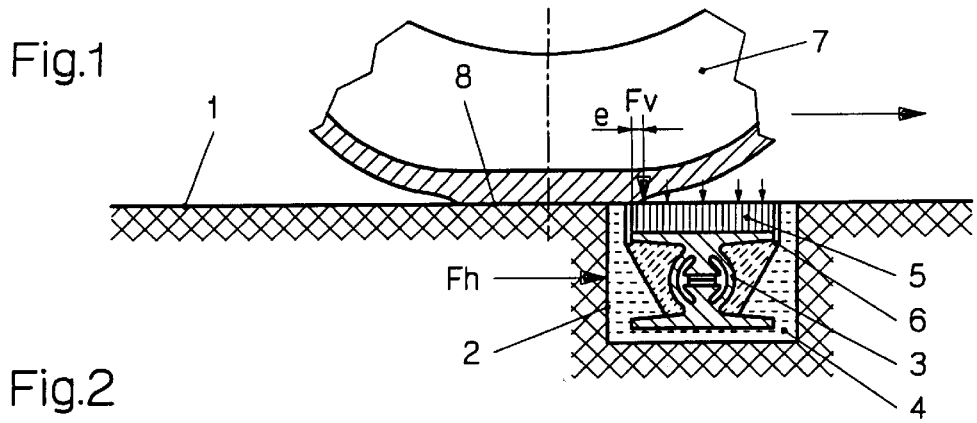
FIG. 1 shows a cross section through a tire, just rolling over the WIM sensor.

FIG. 1 shows the cross section of an important detail of the invention. In the road surface 1, the sensor groove 2 is cut and filled with the embedded force sensor 3, cast into proper position with an epoxy grout 4. A force transmission cast 5, consisting of a mixture of epoxy and sand, is ground perfectly smooth with road surface 1. The sensor 3 is a metallic double T-structure with inserted quartz crystals and is isolated from rolling forces by a rubber tape and a soft filling compound 6, as described in the U.S. Pat. No. 5,461, 924. This solid state sensor has approximately the same elasticity as a standard stone-asphalt road mixture, therefore, no displacement of the sensor surface in relation to the road surface will occur under load. Of importance is the accuracy and repeatability of sensor 3, when the rolling tire 7—and there with the vertical force Fv—touches sensor 3. The error of contact accuracy e must be very small, approximately 1 mm, in order to start the sensor signal.

The invention is, of course, not bound to this patented design of the sensors. It is given as an example and shows the advantage it has, since it can function as a simple switch sensor and, at the same time, as weight (WIM) sensor, thus having a double function, as will be explained later.

Figure 2:
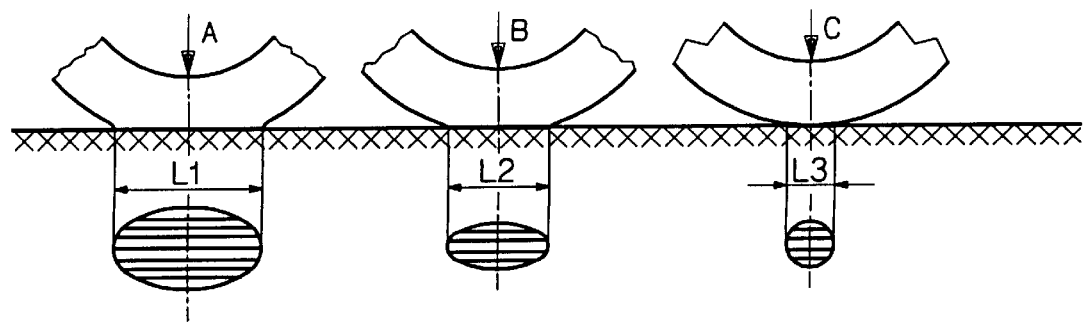
FIG. 2 shows 3 different tires with low, normal and over pressure and the corresponding contact areas.

In FIG. 2, the contact areas 8 (FIG. 1) of three tires with three different tire pressures are shown. The low pressure tire A has the biggest contact area, with the longest length $L_1$. The normal pressure tire B has a medium contact area, with a medium length $L_2$. The high pressure tire C has the smallest contact area, with the smallest length $L_3$. The accurate measurement and discrimination of the different lengths, $L_1$, $L_2$, $L_3$ will become the main target of the inventive selection system.

Figure 3:
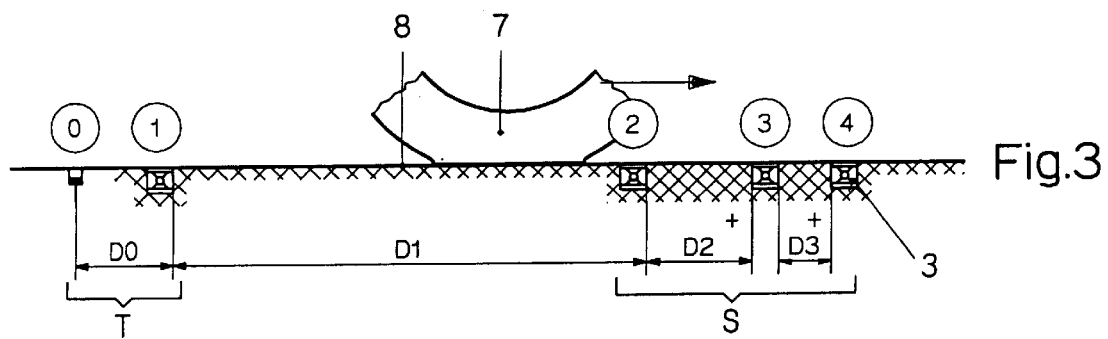
FIG. 3 shows a cross section through a road sector, according to the invention, with 4 WIM sensors and a trigger sensor, embedded in the road surface.
Figure 8:
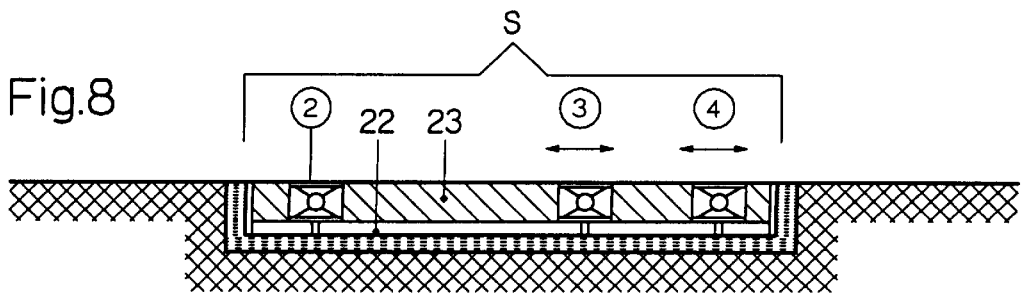
FIG. 8 shows a cross section through the selection group of sensors arranged in a box.

FIG. 3 shows a cross section through the road sector of a monitoring station, according to part of the invention. $\hat{1}$ $\hat{2}$ $\hat{3}$ $\hat{4}$ are WIM sensors as shown in FIG. 1 and FIG. 8 where $\hat{0}$ is a simple trigger line. Sensors $\hat{0}$ and $\hat{1}$ represent the trigger/pre-selection group T and sensors $\hat{2}$ $\hat{3}$ and $\hat{4}$ represent the selector group S. Of importance are the distances of the specific sensors. $D_1$ is not critical and is between 3 and 5 m. The distances $D_2$ and $D_3$, however, are very critical as they determine the selecting principle. $D_2^+$ corresponds to the averaged length $L_2$ plus a tolerance$^+$, $D_3^+$ corresponds to the averaged length $L_3$ plus a tolerance$^+$. These distances have to be kept within ±1 mm. Accordingly, the accuracies of the WIM sensors 3 have to be extremely high and fully repeatable.

Figure 4:
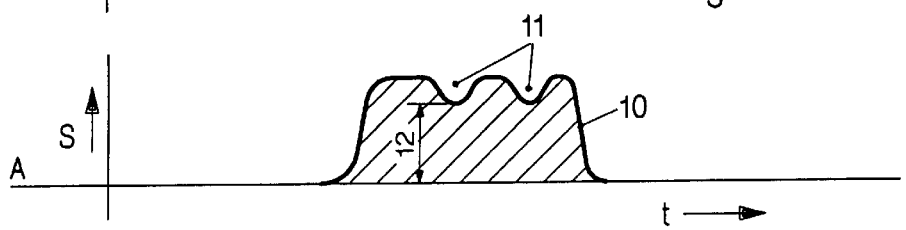
FIG. 4 shows a typical sensor signal of a tire with too low air pressure.

FIG. 4 shows a standard processed signal 10 of the selector group S, after passage of a low pressure tire A. One or two bumps 11, with a reduced amplitude 12, is the stamp of a tire with too low pressure that should be recognized.

Figure 5:
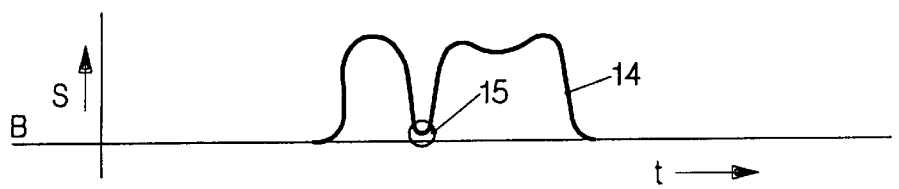
FIG. 5 shows a typical sensor signal of a tire with normal air pressure.

FIG. 5 shows the processed stamp 14 of a normal tire B, with a distinguishable dip 15 to the base line, which does not need further consideration.

Figure 6:
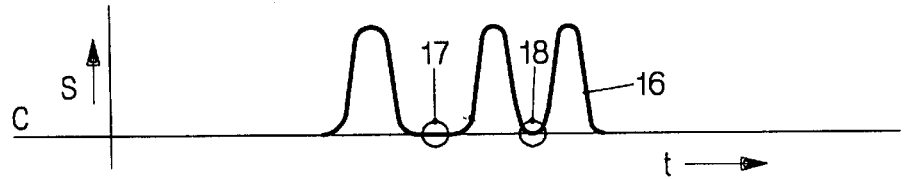
FIG. 6 shows a typical sensor signal for a tire with too high air pressure.

FIG. 6 shows the processed stamp 16 of an over pressure tire C, with two distinguishable dips 17 and 18. This stamp must be further processed.

It is evident that the two stamps 10 and 16, recognized by the computer, are distinctly different and thus can be processed safely at very high speed.

Figure 7:
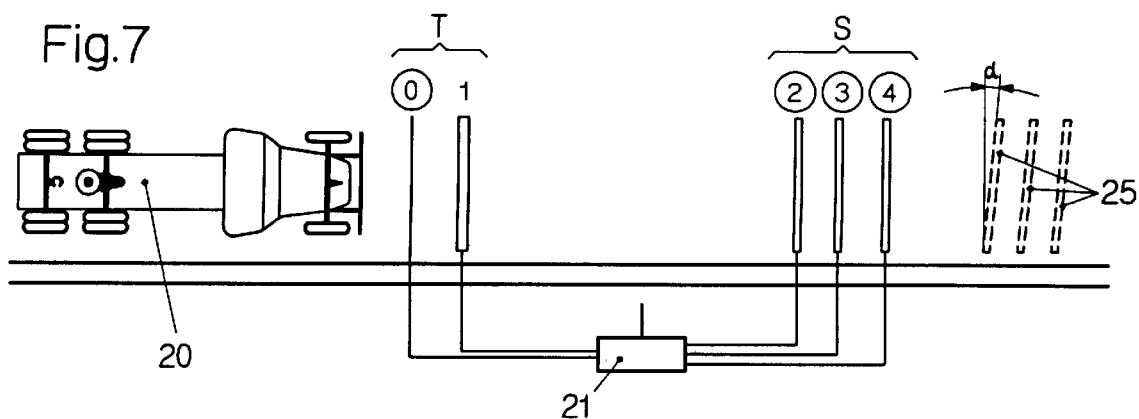
FIG. 7 shows a complete tire pressure monitoring station.

FIG. 7 shows a tire pressure monitoring station from above, according to parts of the invention. The truck 20 approaches the trigger/pre-selection group T which determines vehicle speed and axle weight classification. Afterwards, truck 20 approaches the selector group S of the 3 sensors $\hat{2}$ $\hat{3}$ and $\hat{4}$, where the stamps are compared in the computer box 21 and dispatched via antenna to the command post.

25 shows an alternative mounted group S, under an angle α to standard mounting. This inclination has the advantage in that double wheels can be distinguished and evaluated separately. In some cases, it may be difficult to distinguish the pressures of the tires on double wheel axles by a selector group S, mounted under an angle α However, it is possible to recognize different pressures of the tires of double wheels by analyzing the form of the total signal of both wheels: Both tires have the same pressure if said total signal is symmetric and, vice versa, an asymmetric total signal indicates that both tires are not inflated with the same pressure.

FIG. 8 shows a variant installation to FIG. 3, where the selector group S is in a box with a steel frame 22, allowing change of the distances $D_2$ and $D_3$ of sensors 2 3 and 4, according to optimum selection results. Special filler plates 23 are exchanged and reassembled. There are various possibilities to move the sensors 3 and 4, in small steps, as required after a test period.

Figure 9:
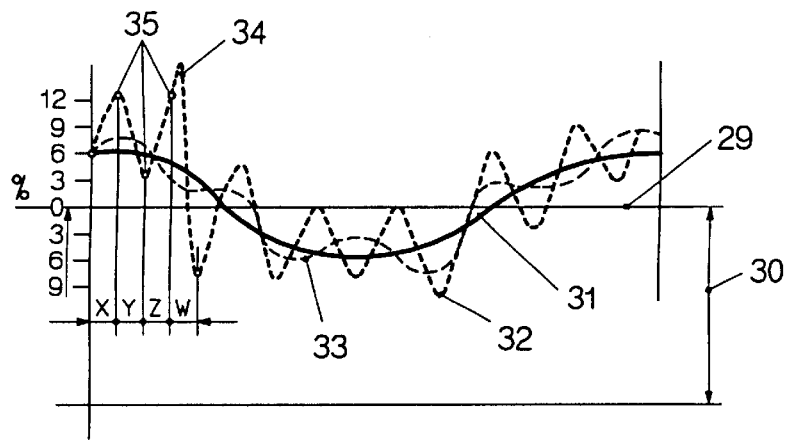
FIG. 9 shows the dynamic load influences on an axle at traffic speed
Figure 10:
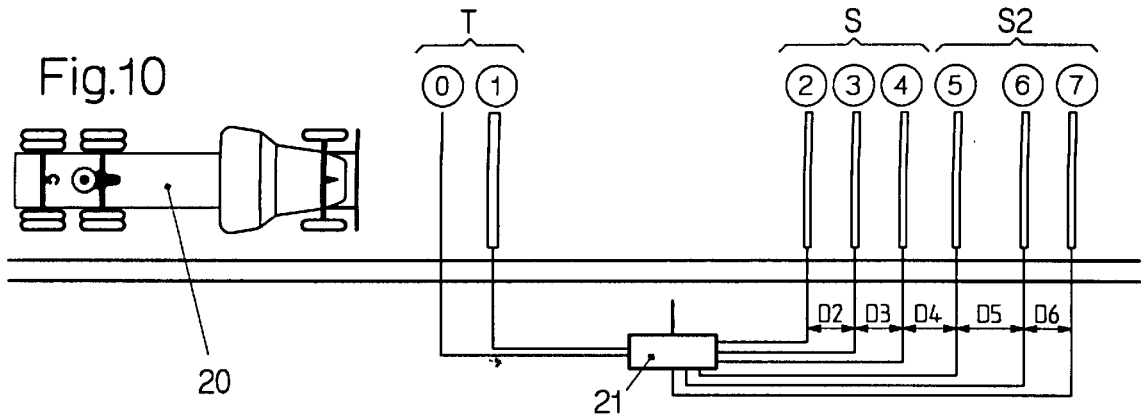
FIG. 10 shows a complete traffic monitoring system for weight, tire pressure and road knock control.

FIG. 9 and 10 show the part of the invention where the "road-knockers" will be monitored.

FIG. 9 shows a graphical presentation of dynamic force influences, acting on an axle or wheel under load and in motion. 29 represents the straight line of the static weight of a given size 30. A ground swell 31 with a frequency of 2.5 to 4 Hz results from the load and the combined spring effects of tire and suspension. Superimposed are effects of the main spring systems: 32 is a conventional mechanical spring system; 33 is an air-rubber spring; 34 are high frequency influences of defect shock absorbers, air springs or auxiliary springs that can cause superimposed heavy knocks.

In order to evaluate this high frequency spectrum of up to 100 Hz, it is necessary to measure at least four maximum and minimum force amplitudes 35 with additional sensors 5 6 7, installed at distances $D_4$, $D_5$ and $D_6$. With an optimized arrangement, the vibration mix-up can be analyzed in time intervals x,y,z,w which is satisfactory for a detection of short time maximum and minimum amplitudes, for instance of road knocks.

FIG. 10 shows a complete monitoring station for weight, air pressure and road knock control. A further interesting aspect of the invention is the fact that e.g. the sensors 2 3 and 4 may be used as switching sensors for air pressure monitoring as well as for force analysis of road knocking or for WIM purposes. The same may be said for sensors 5 6 and 7 of the selector group $S_2$ for force analysis, however, these sensors 5 6 and 7 may also be used for a second category of wheel/tire sizes. All that needs to be adjusted, according to the specific requirements, are electronics and data processing software.

The invention, in combination or as separate units, will lead to a considerable improvement in traffic safety and to a reduction in road repair costs.

It is evident that the invention is applicable not only on highways, but also in bus or truck terminals, where in and outgoing vehicles would be checked automatically for axle weights, for tire inflation and for suspension defects.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A traffic monitoring system comprising:
first, second, third and fourth strip sensors in a road surface;
the first sensor being a pre-selector group and the second, third and fourth sensors being a first selector group;
the pre-selector group being spaced in a direction of travel along the road surface by at least one meter and the sensors in the first selector group being spaced from each other in the direction of travel a distance selected to distinguish different tire print lengths of a selected category of vehicles; and
the sensors being solid-state weight in motion sensors, each having substantially similar design, wherein edges of each sensor emit a start signal precisely upon initial contact by a vehicle upon the sensor edges, thereby providing a precision switch sensor.

2. A traffic monitoring system according to claim 1, including a data processing installation connected to the sensors and which recognizes one or more of stamps of the tire pressures and detect at least four amplitudes of the frequency band of vibrations, in order to analyze the maximum force amplitudes and to detect road knocking.

3. A traffic monitoring system according to claim 1 wherein the selector group is in metal boxes and the sensors are mounted on a metal frame in such a way that at least two of the sensors are selectively movable, adjustable and securable, to optimum distance values.

4. A traffic monitoring system according to claim 3, wherein the inbetween spaces are closed with filler plates and the metal box is cast into the road surface by epoxy grout.

5. A traffic monitoring system according to claim 1, wherein the lengths of tire prints are determined for a given category of vehicles with similar wheel sizes and similar tires, and where for each category a further selector group of sensors is provided, with an additional data processing capability.

6. A traffic monitoring system according to claim 1, including at least a second selector group of a plurality of sensors of the same design as the first selector group, and the sensors in the second selector group being spaced from each other in the direction of travel a distance selected to distinguish different tire print lengths of a second selected category of vehicles.

7. A traffic monitoring system according to claim 6, wherein one of the selector group's sensors is positioned at an angle with respect to the direction of travel to detect double wheels on a vehicle.

8. A traffic monitoring system according to claim 1, wherein the pre-selector group includes a trigger line preceding the first sensor in the direction of travel.

9. A traffic monitoring system comprising:
first, second, third and fourth strip sensors in a road surface;
the first sensor being a pre-selector group and the second, third and fourth sensors being a first selector group;
the pre-selector group being spaced in a direction of travel along the road surface by at least one meter and the sensors in the first selector group being spaced from each other in the direction of travel a distance selected to distinguish different tire print lengths of a selected category of vehicles; and
the sensors being weight in motion sensors having substantially similar design, wherein the sensors have solid state design and a sensor edge which gives an accurate start signal when initially contacted by a given vertical force, the sensors having a very small error range, resulting in a precision switch sensor.

10. A traffic monitoring system comprising:
first, second, third and fourth strip sensors in a road surface;
the first sensor being a pre-selector group and the second, third and fourth sensors being a first selector group;
the pre-selector group being spaced in a direction of travel along the road surface by at least one meter and the sensors in the first selector group being spaced from each other in the direction of travel a distance selected to distinguish different tire print lengths of a selected category of vehicles; and the sensors being weight in motion sensors having substantially similar design, wherein the sensors function as a force sensor as well as a contact switch of high precision, where a switching point of the sensor coincides with a load sensitive edge of the sensor, having an additional switching arrangement that is actuated by a sharp signal rise when a load touches the load sensitive edge of the sensor.

* * * * *